Patented Jan. 4, 1944

2,338,443

UNITED STATES PATENT OFFICE 2,338,443

SUPERPOLYAMIDES AND PROCESS OF PRODUCING SAME

Hugo Kroeper, Heidelberg, Fritz Kohler, Mannheim, and Karl Wolf, Heidelberg, Germany; vested in the Alien Property Custodian No Drawing. Application May 9, 1941, Serial No. 392,812. In Germany May 23, 1940

4 Claims. (Cl. 260—78)

The present invention relates to superpolyamides and a process of producing same.

Superpolyamides, as is known for example from British Patent Specification No. 461,237, can be prepared by condensing certain diamines and dicarboxylic acids or derivatives or salts thereof or mixtures of these materials. The properties of the superpolyamides are dependant, in particular, on the degree of condensation and on the chemical nature of the diamines and dicarboxylic acids employed. The desired degree of condensation can be secured by employing definite temperatures and pressures during the condensation or by adding slight proportions of compounds capable of checking the growth of the chain of molecules in the condensation products, as for example primary amines, ammonia or organic monocarboxylic acids. Superpolyamides prepared in the presence of such additions do not undergo a further condensation upon heating as would be the case with superpolyamides prepared in the absence of such additions, which superpolyamides get tougher and tougher and contain an increasing amount of vapor bubbles when melted for a prolonged time and can therefore in certain cases be worked, for example spun, only with difficulty.

We have now found that superpolyamides which are heat-resistant, i. e. are no longer subject to further condensation and can therefore be well worked, in particular well spun in the molten state, are obtained by condensing about molecular proportions of superpolyamide-forming dicarboxylic acids and diamines in the presence of up to 20 per cent by weight (calculated with regard to the final superpolyamide) of a glutaric acid-diamine salt. The superpolyamides thus obtained also possess a high gloss which is often desirable for films and threads. An addition of 10 per cent of glutaric acid hexamethylenediamine salt to adipic acid-hexamethylenediamine salt, for example yields a superpolyamide which melts only about 30° C. below the superpolyamide from adipic acid-hexamethylenediamine salt alone, and is essentially viscosity stable since it can be kept in the molten state for a long time without its viscosity becoming higher and bubbles being developed, i. e. without undergoing further condensation. Though glutaric acid - diamine salts, when condensed alone, only yield brittle products giving but fragile threads when spun, the loss of mechanical strength is surprisingly small with additions up to 20 per cent according to our invention, and especially at 10 per cent and below, and the practical use of the superpolyamides is not interfered with thereby. It is to be understood that the percentage of the glutaric acid-diamine salt given in the claims is calculated with reference to the final superpolyamide.

The following example serves to illustrate how the present invention may be carried out in practice, but the invention is not restricted to the said example. The parts are by weight.

Example 100 parts of glutaric acid-hexamethylenediamine salt and 900 parts of adipic acid hexamethylenediamine salt are heated to 280° C. in a pressure-tight vessel of chromium-nickel steel, after the air having been eliminated by means of free nitrogen. The pressure produced by the water formed in the condensation is released after at least one hour's heating, whereupon heating is continued at from 280° to 285° C. for 4 hours. The melt of superpolyamide formed is then forced through a nozzle into water. The superpolyamide obtained is well fusible and can be easily spun from the melt without leaving any residue.

In the above example the diamine and dibasic acid constituents are used in the form of the diamine-dibasic acid salts and are, therefore, present in equimolecular proportions.

What we claim is:

1. A process for obtaining viscosity stable superpolyamides which comprises condensing polyamide-forming reactants consisting substantially of equimolecular amounts of diamine and dicarboxylic acid, a substantial amount not exceeding 20% by weight of said reactants being a diamine-dibasic acid which is derived from a dicarboxylic acid other than said first mentioned dicarboxylic acid and which consists of glutaric acid-hexamethylenediamine salt.

2. A process for making superpolyamides which comprises condensing substantially equimolecular amounts of hexamethylenediamine and adipic acid in the presence of a substantial amount not exceeding 20% by weight of a glutaric acid-hexamethylenediamine salt.

3. A viscosity stable superpolyamide which comprises the condensation product of polyamide-forming reactants consisting substantially of equimolecular amounts of diamine and dicarboxylic acid, a substantial amount not exceeding 20% by weight of said reactants being a diamine-dibasic acid which is derived from a dicarboxylic acid other than said first mentioned dicarboxylic acid and which consists of glutaric acid-hexamethylenediamine salt.

4. A viscosity stable superpolyamide which comprises the condensation product of substantially equimolecular amounts of hexamethylenediamine and adipic acid in the presence of a substantial amount not exceeding 20% by weight of a glutaric acid-hexamethylenediamine salt.

HUGO KROEPER.
FRITZ KOHLER.
KARL WOLF.